US008577936B2

(12) United States Patent
Burka et al.

(10) Patent No.: US 8,577,936 B2
(45) Date of Patent: Nov. 5, 2013

(54) FIXUP CACHE TOOL FOR OBJECT MEMORY COMPACTION IN AN INFORMATION HANDLING SYSTEM

(75) Inventors: Peter Wiebe Burka, Ottawa (CA); Jeffrey Michael Disher, Ottawa (CA); Daryl James Maier, Unionville (CA); Aleksandar Micic, Ottawa (CA); Ryan Andrew Sciampacone, Nepean (CA)

(73) Assignee: International Business Machines Corporation, Armonk, NY (US)

(*) Notice: Subject to any disclaimer, the term of this patent is extended or adjusted under 35 U.S.C. 154(b) by 12 days.

(21) Appl. No.: 12/955,271

(22) Filed: Nov. 29, 2010

(65) Prior Publication Data
US 2012/0136906 A1    May 31, 2012

(51) Int. Cl.
*G06F 17/30*    (2006.01)
*G06F 12/00*    (2006.01)

(52) U.S. Cl.
USPC ............ 707/813; 707/803; 707/812; 707/955

(58) Field of Classification Search
None
See application file for complete search history.

(56) References Cited

U.S. PATENT DOCUMENTS

| 4,775,932 | A | * | 10/1988 | Oxley et al. ........................ 1/1 |
| 4,907,151 | A | * | 3/1990 | Bartlett ........................ 711/166 |
| 4,912,629 | A | * | 3/1990 | Shuler, Jr. .......................... 1/1 |
| 5,088,036 | A | * | 2/1992 | Ellis et al. ........................ 1/1 |
| 5,652,883 | A | * | 7/1997 | Adcock ............................ 1/1 |
| 5,870,764 | A | * | 2/1999 | Lo et al. .......................... 1/1 |
| 5,900,001 | A | * | 5/1999 | Wolczko et al. .................... 1/1 |
| 6,093,216 | A | * | 7/2000 | Adl-Tabatabai et al. ....... 717/128 |
| 6,209,003 | B1 | * | 3/2001 | Mattis et al. ........................ 1/1 |
| 6,760,815 | B1 | * | 7/2004 | Traversat et al. ............. 711/135 |
| 6,763,440 | B1 | * | 7/2004 | Traversat et al. ............. 711/159 |
| 6,826,583 | B1 | * | 11/2004 | Flood et al. ........................ 1/1 |
| 7,089,272 | B1 | * | 8/2006 | Garthwaite et al. .................. 1/1 |

(Continued)

FOREIGN PATENT DOCUMENTS

| EP | 1072004 B1 | 1/2001 |
| WO | WO 9953422 A1 * | 10/1999 |

OTHER PUBLICATIONS

Abuaiadh—"An Efficient Parallel Heap Compaction Algorithm", Dept. of Computer Science, Technion—Israel Institute of Technology, Haifa, Israel, (downloaded from diab,yossia,erezp,uris@il.ibm. com on Nov. 8, 2010).

(Continued)

*Primary Examiner* — Kaveh Abrishamkar
*Assistant Examiner* — James J Wilcox
(74) *Attorney, Agent, or Firm* — David Mims; Mark P Kahler

(57) ABSTRACT

An operating system or virtual machine of an information handling system (IHS) initializes a garbage collector to provide object memory compaction during application execution. The operating system or virtual machine performs move and fixup management within heap or object memory stores. The garbage collector identifies holes or unused portions of heap memory and moves one or more objects during compaction operations. After the garbage collector moves the object, a fixup cache tool fixes up the object pointers within the object. The fixup cache tool maintains a fixup cache that includes pointer information corresponding to the objects that the garbage collector moves. The fixup cache tool employs the pointer information within the fixup cache to update or otherwise fixup the objects within the heap that the garbage collector moves during compaction operations. The fixup cache may provide predictive pointer update information during fixup operations for each object move within the heap.

10 Claims, 5 Drawing Sheets

(56) References Cited

U.S. PATENT DOCUMENTS

| | | | |
|---|---|---|---|
| 7,174,354 B2* | 2/2007 | Andreasson | 1/1 |
| 7,392,269 B2* | 6/2008 | Chauvel | 707/700 |
| 7,480,782 B2 | 1/2009 | Garthwaite | |
| 7,539,822 B1* | 5/2009 | Nagarajan et al. | 711/135 |
| 7,548,940 B2* | 6/2009 | Bacon et al. | 1/1 |
| 7,640,544 B2* | 12/2009 | Flood et al. | 718/100 |
| 2002/0138506 A1* | 9/2002 | Shuf et al. | 707/206 |
| 2003/0229766 A1* | 12/2003 | Dice et al. | 711/154 |
| 2004/0078381 A1* | 4/2004 | Blandy et al. | 707/101 |
| 2004/0128329 A1* | 7/2004 | Ben-Yitzhak et al. | 707/206 |
| 2005/0114413 A1* | 5/2005 | Subramoney et al. | 707/206 |
| 2005/0138092 A1* | 6/2005 | Abuaiadh et al. | 707/206 |
| 2006/0173939 A1 | 8/2006 | Yin | |
| 2006/0294165 A1* | 12/2006 | Bacon et al. | 707/206 |
| 2007/0118579 A1* | 5/2007 | Hudson | 707/206 |
| 2008/0021939 A1* | 1/2008 | Dahlstedt et al. | 707/206 |
| 2008/0209149 A1* | 8/2008 | Meyer | 711/166 |
| 2009/0327372 A1 | 12/2009 | Ylonen | |
| 2009/0327374 A1* | 12/2009 | Wright et al. | 707/206 |
| 2010/0223429 A1* | 9/2010 | Cher et al. | 711/122 |

OTHER PUBLICATIONS

Chenney—"A Nonrecursive List Compacting Algorithm", Communications of the ACM, vol. 13, No. 11(Nov. 1970).

Kermany—"The Compressor: Concurrent, Incremental, and Parallel Compaction", (Dept of Computer Science Technion—Israel Institute of Technology, Haifa, Israel ( Nov. 2007).

Venners—"Java's garbage-collected heap"—JAVAWORLD—Solutions for Java Developers (downloaded from JavaWorld at—http://www.javaworld.com/javaworld/jw-08-1996/jw-08-gc.html (Nov. 2010) Original Publication Date: (Aug. 1996).

McGachey—"An Improved Generational Copying Garbage Collector", Master's Thesis, Purdue University (Dec. 2005).

Weigel—"The Single Referent Collector: Optimizing Compaction for the Common Case, ACM Transactions on Architecture and Code Optimization", vol. 6, No. 4, Article 15, (Oct. 2009).

\* cited by examiner

HEAP (OBJECT MEMORY) BEFORE OBJECT MOVES
AND BEFORE OBJECT FIXUP

HEAP (OBJECT MEMORY) AFTER OBJECT MOVES
AND AFTER OBJECT FIXUP

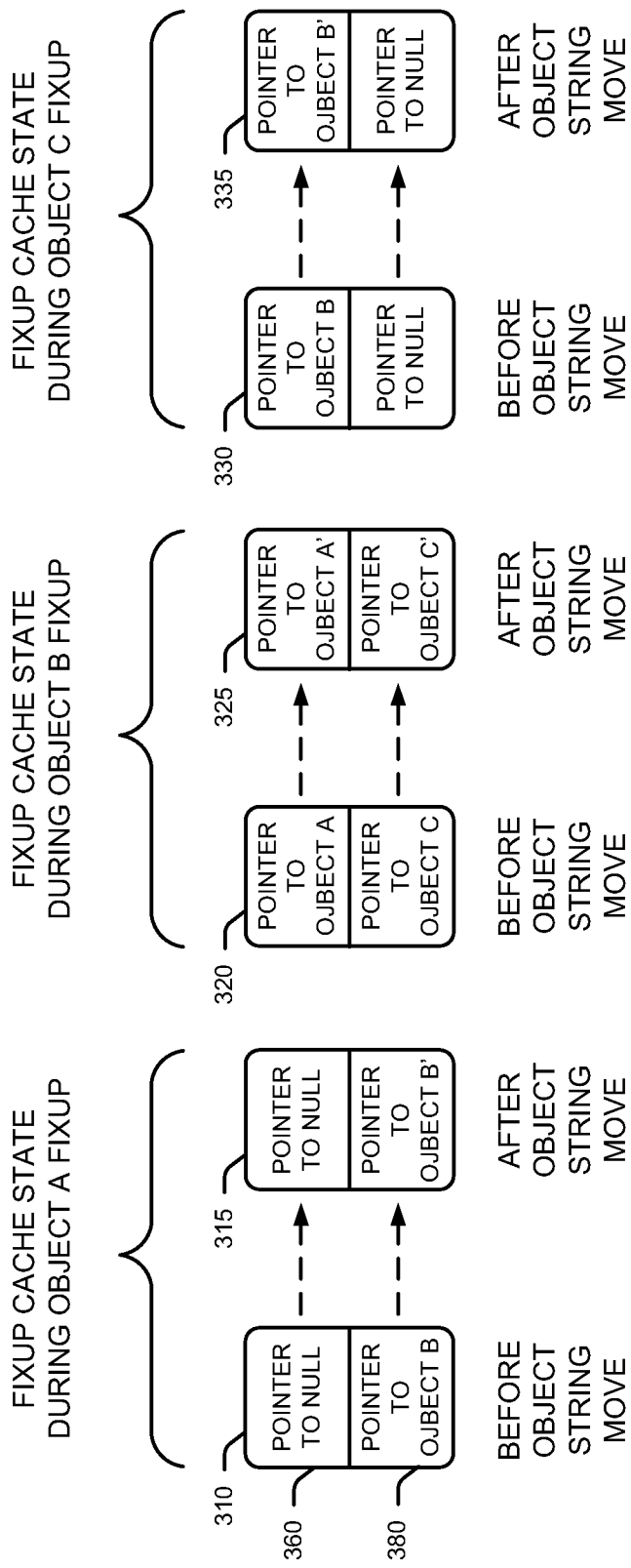

FIXUP CACHE GARBAGE COLLECTOR HEAP (OBJECT MEMORY) COMPACTION METHOD AND TOOL

FIXUP CACHE TOOL FOR OBJECT MEMORY COMPACTION IN AN INFORMATION HANDLING SYSTEM

BACKGROUND

The disclosures herein relate generally to information handling systems (IHSs), and more specifically, to the management of object memory compaction in an IHS.

Information handling systems (IHSs) typically employ operating systems that execute applications or other processes that may require the resources of multiple processors or processor cores. IHSs may employ virtual machine (VM) technology such as that which the Java Development Kit (JDK) or Java Runtime Environment (JRE) virtual machines (VMs) provide. (Java is a trademark of the Oracle Corp.) A Java virtual machine (JVM) or other virtual machine may provide application execution capability during development, debugging, or real time program operations. The virtual machine may employ a block of memory, such as a heap, within IHS memory during application execution. The heap provides a memory structure for object memory management and other dynamic memory uses. The virtual machine may organize the object memory or heap into a special data structure for storage of objects that the executing application generates and uses.

The JVM or virtual operating system of an IHS may employ garbage collector software for use in heap object memory management. In particular, a garbage collector may provide object memory or heap compaction when object memory fragmentation occurs. Effective garbage collectors and compactor tools may significantly improve application execution efficiency in an IHS.

BRIEF SUMMARY

In one embodiment, a method of moving objects with a garbage collector tool and fixup cache tool is disclosed. The method includes storing an object string in a memory heap, the object string including first and second objects, wherein the first object points to the second object, the second object pointing to another object. The method also includes moving, by the garbage collector tool, one of the first and second objects to a new location in the memory heap, thus providing a moved object. The method further includes storing in a fixup cache, by a fixup cache tool associated with the garbage collector, location pointer information corresponding to the moved object. The method still further includes modifying the moved object, by the fixup cache tool, with the location pointer information stored in the fixup cache and corresponding to the moved object.

In another embodiment, an information handling system (IHS) is disclosed that includes a processor and a memory coupled to the processor. The memory includes a garbage collector tool. The garbage collector tool is configured to store an object string in a memory heap within the memory, the object string including first and second objects, wherein the first object points to the second object, the second object pointing to another object. The garbage collector tool is also configured to move one of the first and second objects to a new location in the memory heap, thus providing a moved object. The memory further includes a fixup cache tool. The fixup cache tool is configured to store in a fixup cache location pointer information corresponding to the moved object. The fixup cache tool is also configured to modify the moved object with the location pointer information stored in the fixup cache and corresponding to the moved object.

In yet another embodiment, a computer program product is disclosed. The computer program product includes a computer readable storage medium. The computer program product also includes first instructions that store an object string in a memory heap, the object string including first and second objects, wherein the first object points to the second object, the second object pointing to another object. The computer program product further includes second instructions that move one of the first and second objects to a new location in the memory heap, thus providing a moved object. The computer program product still further includes third instructions that store in a fixup cache location pointer information corresponding to the moved object. The computer program product also includes fourth instructions that modify the moved object with the location pointer information stored in the fixup cache and corresponding to the moved object. The first, second, third and fourth program instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3 shows a fixup cache in multiple states after object moves and during fixup operations within an IHS that employs the disclosed fixup cache methodology.

DETAILED DESCRIPTION

Figure 1:
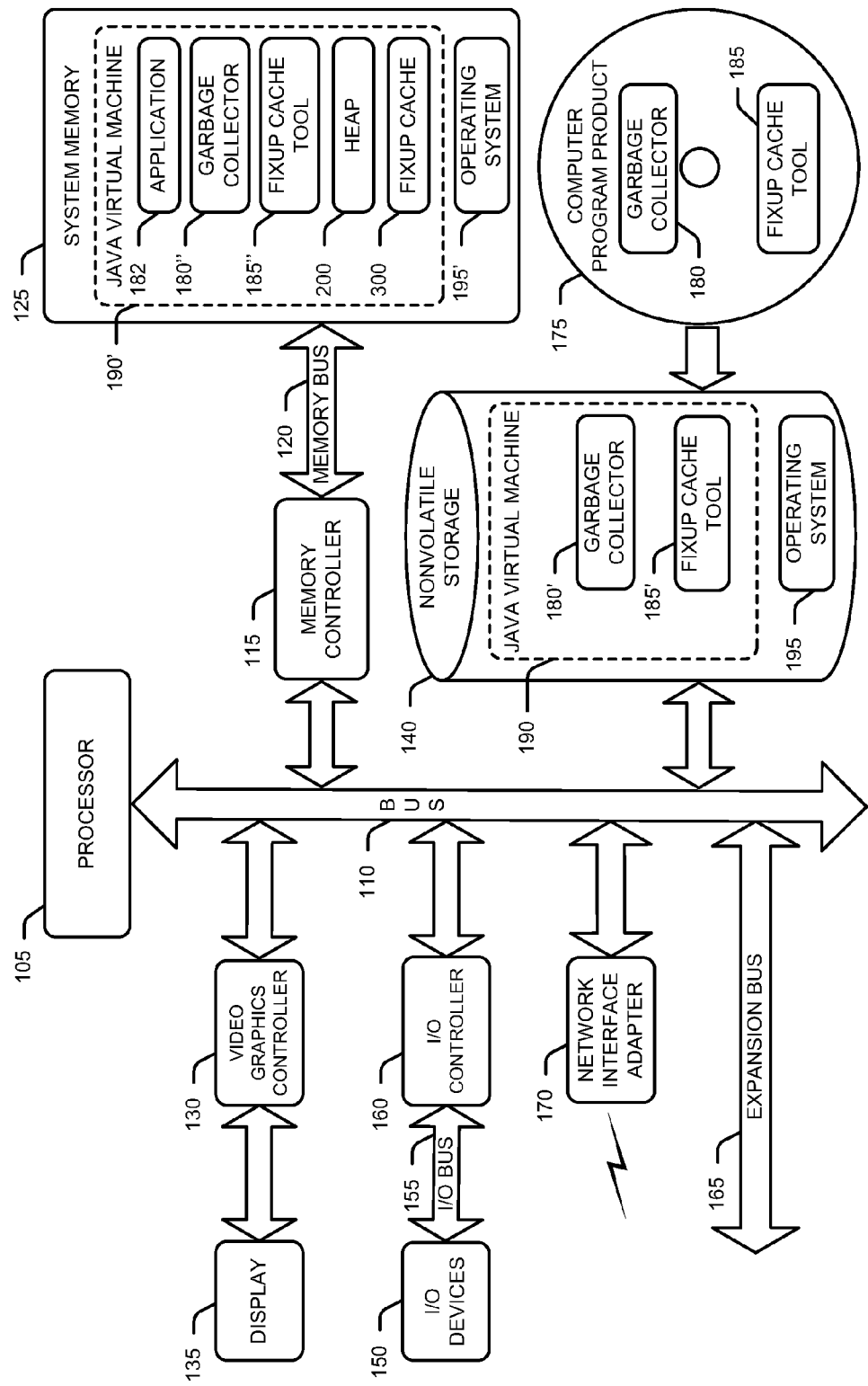
FIG. 1 shows a block diagram of a representative information handling system (IHS) that employs the disclosed fixup cache methodology.

Information handling systems (IHSs) typically employ operating systems that execute applications or other processes within the IHS. The IHS may include multiple processors, such as processor cores, or other processor elements for application execution and other tasks. The IHS may execute applications or processes within a virtual environment, such as a Java virtual machine (JVM) environment. The JVM or virtual machine operating system resides within memory resources of the IHS. The JVM may include garbage collector software for management of application heap or object memory resources during application execution. An operating system or JVM may employ heap-based memory allocation or dynamic memory allocation during application execution. Heap memory is useful within the limited memory resources of an IHS during sharing of objects and object data by one or more executing applications.

The garbage collector is a special resource management tool that supports application execution within a limited resource environment, such as limited IHS memory resources. The garbage collector attempts to recover or reclaim heap or object memory resources that the application no longer needs or uses. Objects are typically a subset of a class within the executing application. For example, if an application describes a class, such as fruit, an apple may be one example of an object of that class.

If an application describes a character string class, an object may be a particular text character of a larger character string class or object string. Many other class and object relationships are possible within the executing application. Filling heap or object memory holes is another way to view one responsibility of the garbage collector. The garbage collector attempts to fill holes in the heap memory with new object information. The heap holes may include objects that the executing application no longer needs.

As part of filling holes or moving objects within the heap, the garbage collector may fix up, herein referred to as "fixup" or update pointer references between objects of the object memory as part of heap memory compaction operations. This compaction and fixup process or operation may require multiple IHS clock cycles to implement and is of concern to designers who desire performance efficiencies within the IHS. During fixup, the garbage collector may examine a particular object move that employs references to other objects and update those references during or after the particular object move.

In one embodiment, the fixup operation may require calculation to determine the new locations within object memory of the moving object. These calculations require processor clock cycle time and may consume precious IHS resources. In another embodiment, the fixup operation may require lookup tables and memory accesses to determine new location pointers for the moving objects. Again, this type of object pointer lookup operation has the potential to consume critical IHS resources.

Objects that are adjacent within the heap, such as character string or object string data, may benefit from cache operations, such as those of specialized fixup cache pointer operations. For example, if one particular object of an object string moves, that object may require only one pointer to reference it's relationship to the entire object string. In this case, a fixup cache may maintain and update the one pointer reference for that particular moving object. During the move of that particular object, the IHS may employ the fixup cache as a hit or miss memory resource for object pointer information as well as information for pointer fixup within the object memory location of the heap.

A small fixup cache may provide useful performance enhancements in particular for moving objects that include pointer pairs. For example, Java character strings, include pointer pairs between single pairs of objects for each adjacent object pair, such as a string object and character array object. In an object string, one character string object may point to the next character string object and so forth until the last character string object completes the string. In this case, a small fixup cache may provide for optimization of cache memory size, lookup memory times, and pointer fixup operational efficiencies.

FIG. 1 shows an information handling system (IHS) 100 with a garbage collector 180 and a fixup cache tool 185 that employs the disclosed fixup cache methodology during execution of an application 182. In one embodiment, garbage collector 180 may include fixup cache tool 185. In another embodiment, fixup cache tool 185 may be external to garbage collector 180 as shown in FIG. 1. In this particular embodiment, application 182 executes within a Java virtual machine (JVM) 190. In other embodiments, application 182 may execute within other types of virtual machines. JVM 190 may include an object memory or a heap 200 described in more detail below.

IHS 100 includes a processor 105. In one embodiment, processor 105 may include multiple processors cores (not shown). IHS 100 processes, transfers, communicates, modifies, stores or otherwise handles information in digital form, analog form or other form. IHS 100 includes a bus 110 that couples processor 105 to system memory 125 via a memory controller 115 and memory bus 120. In one embodiment, system memory 125 is external to processor 105. System memory 125 may be a static random access memory (SRAM) array or a dynamic random access memory (DRAM) array.

Processor 105 may also include local memory (not shown) such as L1 and L2 caches (not shown). A video graphics controller 130 couples a display 135 to bus 110. Nonvolatile storage 140, such as a hard disk drive, CD drive, DVD drive, or other nonvolatile storage couples to bus 110 to provide IHS 100 with permanent storage of information. I/O devices 150, such as a keyboard and a mouse pointing device, couple to bus 110 via I/O controller 160 and I/O bus 155.

One or more expansion busses 165, such as USB, IEEE 1394 bus, ATA, SATA, PCI, PCIE, DVI, HDMI and other busses, couple to bus 110 to facilitate the connection of peripherals and devices to IHS 100. A network interface adapter 170 couples to bus 110 to enable IHS 100 to connect by wire or wirelessly to a network and other information handling systems. In this embodiment, network interface adapter 170 may also be called a network communication adapter or a network adapter. While FIG. 1 shows one IHS that employs processor 105, the IHS may take many forms. For example, IHS 100 may take the form of a desktop, server, portable, laptop, notebook, netbook, tablet or other form factor computer or data processing system. IHS 100 may take other form factors such as a gaming device, a personal digital assistant (PDA), a portable telephone device, a communication device or other devices that include a processor and memory.

IHS 100 employs an operating system (OS) 195 that may store information on nonvolatile storage 140. IHS 100 includes a computer program product on digital media 175 such as a CD, DVD or other media. In one embodiment, a designer or other entity configures the computer program product with garbage collector 180 and fixup cache tool 185 software, to practice the disclosed fixup cache methodology. In practice, IHS 100 may store garbage collector 180 and fixup cache tool 185 on nonvolatile storage 140 as garbage collector 180' and fixup cache tool 185', respectively. Nonvolatile storage 140 may store JVM 190 and OS 195. JVM 190 may include garbage collector 180', and fixup cache tool 185'.

When IHS 100 initializes, the IHS loads JVM 190 and OS 195 into system memory 125 for execution as JVM 190' and OS 195', respectively. Within system memory 125, JVM 190' includes application 182, garbage collector 180", fixup cache tool 185", heap 200, and fixup cache 300. During execution of application 182, JVM 190 may employ garbage collector 180 to manage objects within object memory or heap 200. In accordance with the disclosed methodology, garbage collector 180 may employ fixup cache tool 185 along with fixup cache 300, heap 200, and other memory management tools to compact or defragment portions of heap 200 and fix pointers between relational objects, such as character string objects within heap 200. In one embodiment, IHS 100 may employ JVM 190 as a virtual machine (VM) of a virtual machine environment. For example, IHS 100 may employ Java JDK or Java JRE to enable VM technology. Other embodiments may employ other virtual machine environments depending on the particular application.

Figure 2A:
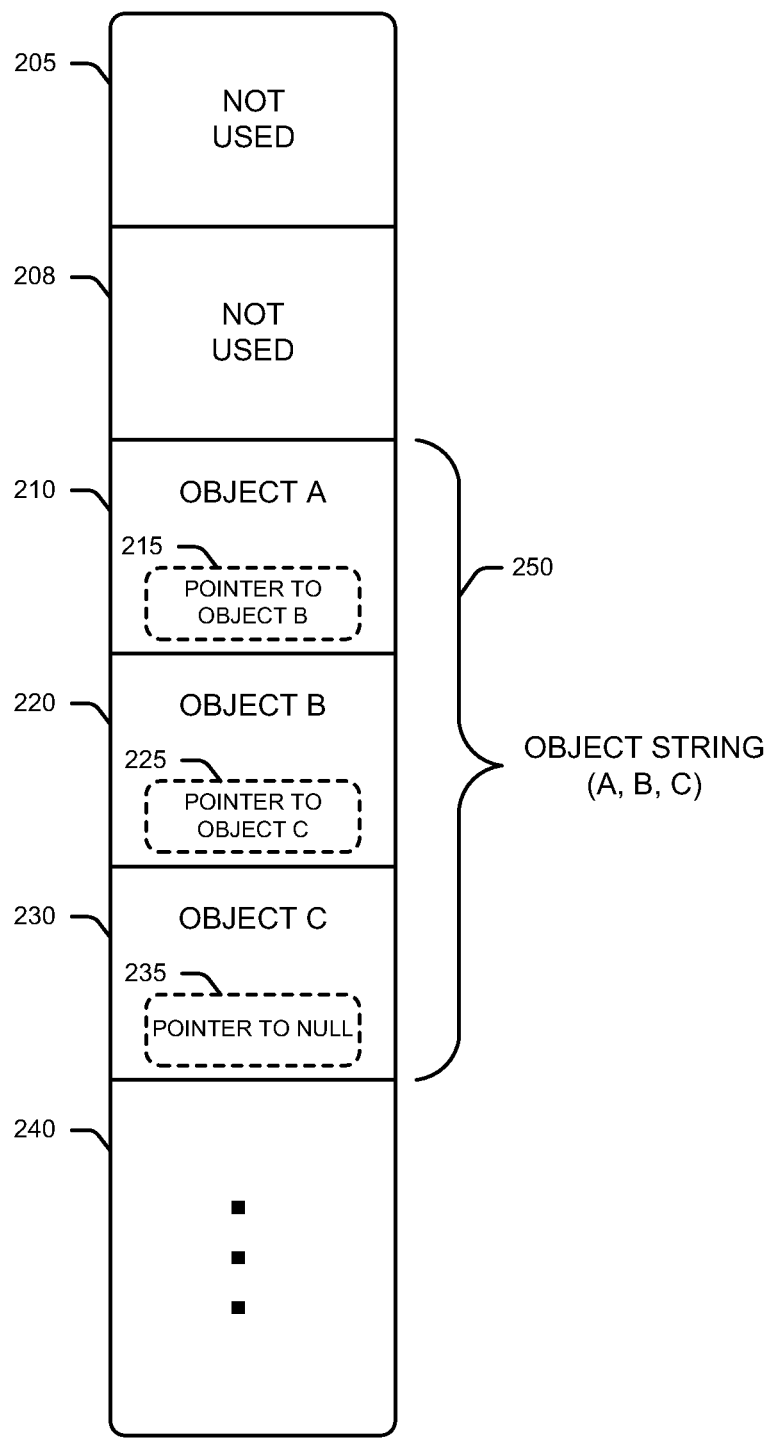
FIG. 2A shows a heap (object memory) prior to object moves and fixup operations within an IHS that employs the disclosed fixup cache methodology.

FIG. 2A is a block diagram of heap 200 or object memory that JVM 190 populates with object information during application 182 execution. JVM 190 may employ a memory block or portion of system memory 125 as heap 200. In one embodiment of the disclosed fixup cache tool, heap 200 includes object information, such as Java object strings, character strings, or other object information. Heap 200 may include multiple memory locations or cells. During application 182 execution, some of the memory locations within heap 200 may be empty or not used. A not used memory location within heap 200 may include object information no longer useful or required by application 182 or other JVM 190 resources. For example, heap 200 includes a memory location 205 that is not used. Memory location 205 is an unused portion of heap 200 memory or a hole in heap 200. Heap 200 includes other holes or unused portions of object memory, for example not used memory location 208, and other unused memory locations (not shown).

Heap 200 includes object A information within memory location 210. Heap 200 also includes object B and object C information within memory location 220 and memory location 230, respectively. Object A within memory location 210 employs a pointer 215 that points to object B within memory location 220. In one embodiment, object A points to the next object or object memory location, namely object B of an object string 250 within heap 200. In another embodiment, pointer 215 may reside in other memory locations, such as a memory table (not shown) within JVM 190 or within memory array information (not shown), or other stores or resources of IHS 100.

Object B employs a pointer 225 that points to object C. Object C employs a pointer 235 that points to a null location or non-existent location that garbage collector 180 interprets as an end of string. In other words, object C is the final or last object in the object string 250. Stated in another manner, the null pointer indicates to JVM 190 and JVM 190 resources that object C is the last object in an object string of data, namely object string 250. Object string 250 may be a link, string, or relational chain of object information. In one embodiment of the disclosed fixup cache tool, object string 250 is a Java language string of A, B, and C information.

For example, object A within memory location 210 may represent a text data of "A", object B within memory location 220 may represent a text data of "B", and object C within memory location 230 may represent a text data of "C". Object string 250 begins with object A within memory location 210 and ends with object C within memory location 230. The pointer information that heap 200 maintains within each object memory location provides the linkage or chain to properly organize the object string 250 data.

Heap 200 may include multiple other memory locations as shown by the ellipsis ( . . . ) at memory location 240. Memory location 240 may include multiple object memory as well as multiple not used memory locations of heap 200. JVM 190 employs garbage collector 180 that provides object memory compaction, relocation, defragmentation as well as other features. In one embodiment of the disclosed fixup cache tool, garbage collector 180 may move or compact object string 250 or any portion of object memory within heap 200. In this manner, garbage collector 180 may attempt to reuse unused portions of heap 200 and provide a more efficient organization of object memory within heap 200.

Figure 2B:
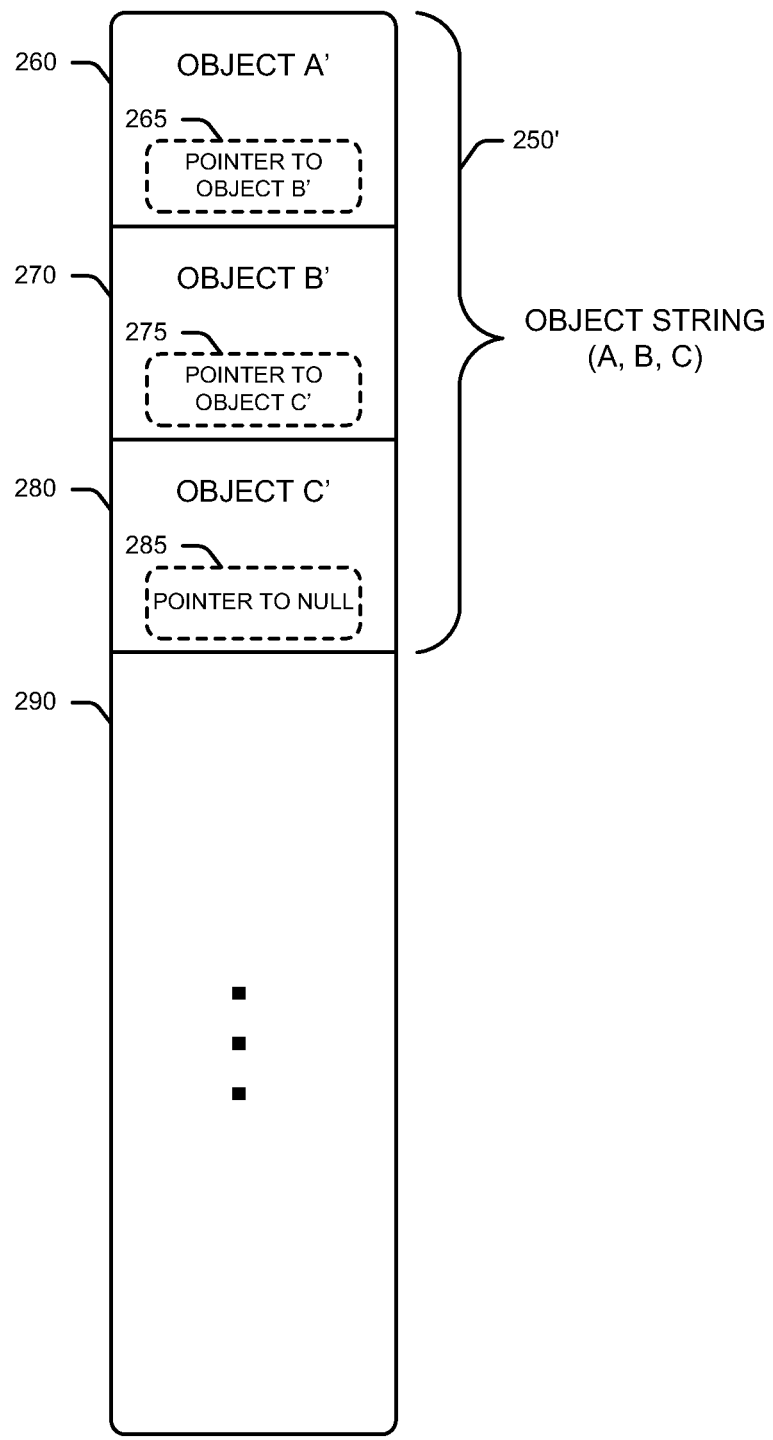
FIG. 2B shows a heap (object memory) after object moves and fixup operations within an IHS that employs the disclosed fixup cache methodology.

FIG. 2B is a block diagram of heap 200 or object memory that JVM 190, and more specifically garbage collector 180, populates with object information. FIG. 2B shows heap 200 after garbage collector 180 moves the object or object string. In one embodiment, garbage collector 180 compacts the object string 250 of FIG. 1A to form a compacted object string 250', as shown in FIG. 2B. More particularly, garbage collector 180 compacts heap 200 by moving the objects of object string 250 to new heap locations and replacing unused portions of heap 200 memory. For example, garbage collector 180 may move object string 250 to the top of heap 200 as object string 250' and provide improvements in fragmentation for heap 200 memory. FIG. 2B depicts object string 250 in a new location, namely object string 250' of heap 200. Although the character string information, namely characters A, B, and C of object string 250 may remain intact after an object memory move, the pointer information for each object may need updating or fixing up.

For example, garbage collector 180 may move object A from the memory location 210 of heap 200, as shown in FIG. 2A, to a corresponding memory location 260, as shown in FIG. 2B as object A'. Garbage collector 180 moves object B from memory location 220, as shown in FIG. 2A to memory location 270 as object B'. As the final or last object in object string 250, garbage collector 180 moves object C from memory location 230, as shown in FIG. 2A to memory location 280 as object C'.

Object A' employs a pointer 265 that points to the new location of object B or more specifically to object B' in heap 200. Heap 200 includes a memory location 270 corresponding to object B'. Object B' employs a pointer 275 that points to the new location of object C or to object C'. Heap 200 includes a memory location 280 corresponding to object C'. In one embodiment of the disclosed fixup cache tool, object C' employs a pointer 285 that points to a null location indicating that object C' is the last object in object string 250'. Heap 200 may include multiple other memory locations as shown by memory location 290. Memory location 290 may include multiple objects in memory as well as multiple not used memory locations within heap 200.

FIG. 3 is a representation of a fixup cache 300 that shows memory states during multiple object fixup operations by fixup cache tool 185. In one embodiment of the disclosed fixup cache tool, fixup cache 300 resides in the memory stores of IHS 100, such as system memory 125. Fixup cache 300 may reside within JVM 190 or in other memory (not shown) of IHS 100. FIG. 3 depicts fixup cache 300 in 6 different states, as described in more detail below. From left to right, as shown in FIG. 3, fixup cache 300 is shown during fixup operations of three objects of object string 250. In one embodiment of the disclosed fixup cache tool, fixup cache 300 employs 2 memory cells as shown by row 360, row 380 and the corresponding dashed arrows from left to right. Row 360 depicts a $1^{st}$ cell of the 2 cells of fixup cache 300 in 6 different states. Similarly, row 380 depicts a $2^{nd}$ cell of the 2 cells of fixup cache 300 in 6 different states.

Fixup cache 300 stores and provides fixup information for fixup cache tool 185 to properly re-assign pointer information to objects that garbage collector 180 moves during compaction operations of objects within heap 200. The 6 states of fixup cache 300 include the fixup states for 3 objects of object string 250 and includes before and after object move pointer data. For example, fixup cache 300 includes a pointer to null that represents a preceding object with respect to object A within memory location 210, as shown in column 310/row 380. In this example, the null pointer indicates that object A does not have a preceding object in object string 250 and thus object A is the first object in object string 250.

Referring to FIG. 2A, object A information within memory location 210 includes a pointer to object B. In a corresponding fashion, fixup cache 300 includes a pointer to object B, as shown in column 310/row 380. In this manner, fixup cache 300 includes all pointer information necessary to determine the relative object relationships for object A within memory location 210 before any object string 250 move. Fixup cache 300 information in column 310 depicts pointer information for object A prior to any fixup operations by fixup cache tool 185 for object A.

As shown in FIGS. 2A, and 2B, garbage collector 180 moves object string 250 from old memory locations within heap 200 to new object string 250' memory locations. In particular, object string 250 that includes old memory locations 210, 220, and 230 moves to new locations within heap 200, namely memory locations 260, 270, and 280.

Referring again to FIG. 3, pointer to null information, as shown in column 310/row 360 provides a pointer indicating that object A is the first or initial object in object string 250. Pointer to object B information, as shown in column 310/row 380 provides a pointer indicating that object B follows object A in object string 250. As part of compaction operations, garbage collector 180 moves object A from within memory location 210 to object A' within memory location 260 of heap 200.

Object A and object A' may include the same object memory information, such as a text character "A", however each exhibits unique pointer information. For example, object A points to object B, and object A' points to object B'. In this manner, object A points to the next object in object string 250, namely object B. Similarly, after garbage collector 180 moves object string 250 to new memory locations within heap 200, object A' points to the next object in object string 250', namely object B'.

After garbage collector 180 moves object string 250, such as the move shown in FIG. 2B, fixup cache tool 185 may fixup or replace the pointer information within object A, shown in memory location 210 of FIG. 2A, with new object A' pointer information, as shown in memory location 260 of FIG. 2B. The pointer information in fixup cache 300 of FIG. 3, as shown in column 310, is no longer valid or no longer relevant after object string 250, and more specifically after object A, moves to a new location within heap 200. In other words, after the move and fixup operation, the pointer information in fixup cache 300 may be no longer needed or relevant to application 182.

The $2^{nd}$ column, namely column 315, of fixup cache 300 information or the $2^{nd}$ of 6 states for fixup cache 300, as shown in FIG. 3, shows pointer update information after the object string 250 move. Fixup cache tool 185 replaces the contents of fixup cache 300 with the pointer information, as shown in column 315, after the object A fixup operation. For example, fixup cache tool 185 populates fixup cache 300 with pointer to null and pointer to object B' information, as shown in column 315/row 360 and column 315/row 380, respectively.

After garbage collector 180 moves object A to the new object A' location, namely memory location 260 of heap 200, fixup cache 300 maintains new fixup pointer information corresponding to object A'. Pointer to null information, as shown in column 315/row 360 provides a pointer indicating that object A' is the first or initial object in object string 250'. Pointer to object B' information, as shown in column 315/row 380 provides a pointer indicating that object B' follows object A' in object string 250'.

In one embodiment, a resource of application 182 requires the information of object A during the move of object string 250 and prior to the fixup of object A. For example, application 182 may initiate an object A read operation. In that case, the application 182 resource may first interrogate fixup cache 300 for object A location information. For example, the application 182 resource may interrogate fixup cache 300 to locate object A prior to object A fixup. If fixup cache 300 includes pointer information corresponding to object A, then the application 182 resource interrogation receives a fixup "cache hit". If fixup cache 300 does not include pointer information for object A, then the application 182 resource interrogation receives a fixup "cache miss". In one embodiment, JVM 190 employs fixup cache 300 as a predictive cache as opposed to a recently used information cache. In this manner, during "cache hits" application 182 benefits from the predictive capability of fixup cache 300 object pointer data.

In the case of a cache miss, the application 182 resource may need to interrogate another memory resource, such as a global relocation table (not shown) or other memory resource of IHS 100. In that scenario, application 182 will require more clock cycles or resources of IHS 100 to perform the object A read operation. Cache hits in fixup cache 300 provide improvement in application 182 execution times as well as improvement in the efficient use of IHS 100 resources. FIG. 3 depicts fixup cache 300 during object B fixup in the $3^{rd}$ and $4^{th}$ states, as shown in column 320, and column 325 respectively.

During object B fixup, the fixup cache 300 states are shown before the object string 250 move and after the object string 250 move in column 320 and column 325, respectively. Pointer to object A information, as shown in column 320, row 360 provides a pointer indicating that object A is the preceding object in object string 250 with respect to object B. Pointer to object C information, as shown in column 320, row 380 provides a pointer indicating that object C follows object B in object string 250.

As part of compaction operations, garbage collector 180 moves object B from within memory location 220 to object B' within memory location 270 of heap 200. Object B and object B' may include the same object memory information, such as a text character "B", however each exhibits unique pointer information. For example, object B may point to the preceding object A and the following object C. However, object B' may point to the preceding object A' and the following object C'. In this manner, object B points to the preceding object in object string 250, namely object A and to the following object C. Similarly, after garbage collector 180 moves object string 250 to new memory locations within heap 200, object B' points to the preceding object in object string 250', namely object A' and to the following object C'.

After garbage collector 180 moves object string 250, such as the move shown in FIG. 2B, fixup cache tool 185 may fixup or replace the pointer information within object B, shown in memory location 220, with new object B' pointer information, as shown in memory location 270. The information in fixup cache 300, as shown in column 320 is no longer valid or no longer relevant after the object string 250 move, and more specifically after object B moves to a new location within heap 200. In other words, after the move and fixup operation, the pointer information in fixup cache 300 may be no longer needed or relevant to application 182. The $4^{th}$ column, namely column 325, of fixup cache 300 information or the $4^{th}$ of 6 states of fixup cache 300 shows pointer update information after the move of object string 250.

Fixup cache tool 185 replaces the contents of fixup cache 300 with the pointer information, shown in column 325, after the object B fixup operation. For example, fixup cache tool 185 populates fixup cache 300 with pointer to object A' and pointer to object C' information, as shown in column 325/row 360 and column 325/row 380, respectively. After garbage collector 180 moves object B to the new object B' location, namely memory location 270 of heap 200, fixup cache 300 provides new fixup pointer information corresponding to object B'.

Pointer to object A' information, as shown in column 325/row 360 provides a pointer indicating that object A' precedes object B' in object string 250'. Pointer to object C' information, as shown in column 325/row 380 of fixup cache 300 provides a pointer indicating that object C' follows object B' in object string 250'. FIG. 3 depicts fixup cache 300 during object C fixup in the 5$^{th}$ and 6$^{th}$ states of fixup cache 300, as shown in column 330 and column 335, respectively. During object C fixup, the fixup cache 300 states are shown before the object string 250 move and after the object string 250 move to object string 250' in column 330 and column 335, respectively.

Pointer to object B information, as shown in column 330/row 360 provides a pointer indicating that object B is the preceding object in object string 250 to that of object C. Pointer to null information, as shown in column 330/row 380 provides a pointer indicating that object C is the last or final object in object string 250. As part of compaction operations, garbage collector 180 moves object C from within memory location 230 to object C' within memory location 280 of heap 200. Object C and object C' may include the same object memory information, such as a text character "C", however each exhibits unique pointer information.

For example, object C may point to the preceding object B and to the next or following object null. However, object C' may point to the preceding object B' and the following object null. In this manner, object C points to the preceding object in object string 250, namely object B and to the following object null. The following object null indicates that object C is the last or final object of object string 250. Similarly, after garbage collector 180 moves object string 250 to new memory locations within heap 200, object C' points to the preceding object in object string 250', namely object B' and to the following object null. The pointer to null information indicates that object C' is the last object in object string 250'.

After garbage collector 180 moves object string 250, such as the move shown in FIG. 2B, fixup cache tool 185 may fixup or replace the pointer information within object C, shown in memory location 230, with new object C' pointer information, as shown in memory location 280. The information in fixup cache 300, as shown in column 330 is no longer valid or no longer relevant after object string 250, and more specifically after object C moves to a new location within heap 200. In other words, after the move and fixup operation, the pointer information in fixup cache 300 may be no longer needed or relevant to application 182. The 5$^{th}$ column of fixup cache 300 information, or the 5$^{th}$ of 6 states for fixup cache 300 shows pointer update information after the object string 250 move.

Fixup cache tool 185 replaces the contents of fixup cache 300 with the pointer information, as shown in column 335, after the object C fixup operation. For example, fixup cache tool 185 populates fixup cache 300 with pointer to object B' and pointer to null information, as shown in column 335/row 360 and column 335/row 380, respectively. After garbage collector 180 moves object C to the new object C' location, namely memory location 280 of heap 200, fixup cache 300 provides new fixup pointer information corresponding to object C'.

Pointer to object B' information, as shown in column 335/row 360 provides a pointer indicating that object B' precedes object C' in object string 250'. Pointer to null information, as shown in column 335/row 380 of fixup cache 300 provides a pointer indicating that object C' is the last or final object in object string 250'. In one embodiment of the disclosed fixup cache tool, fixup cache 300 includes 2 cells of information. In other embodiments, fixup cache 300 may include any number of cells for fixup cache information.

A larger number of fixup cache 300 cells may provide improvements in opportunities for cache hits and may decrease object lookup time during application 182 execution. However, the larger the number of fixup cache 300 cells, the larger the overhead for managing fixup cache 300 memory resources becomes. System users may optimize fixup cache 300 memory cell sizes for best operational efficiency of IHS 100 during application execution, such as application 182. In this manner, fixup cache 300 provides storage for dynamically changing location pointer information corresponding to moving objects.

Figure 4:
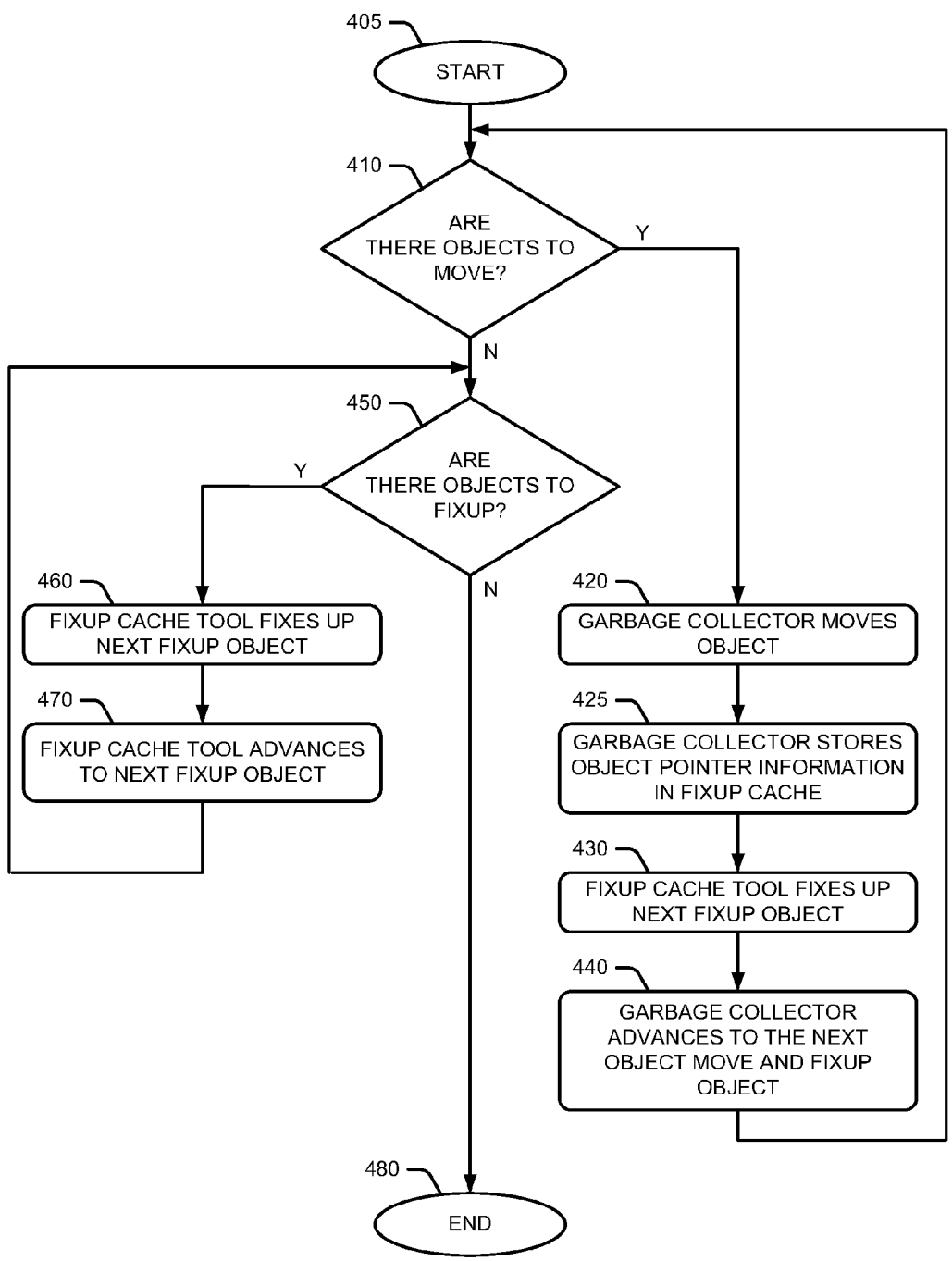
FIG. 4 depicts a flowchart of an embodiment of the disclosed fixup cache method that provides IHS heap (object memory) compaction and fixup cache capability.

FIG. 4 is a flowchart that shows process flow in an embodiment of the disclosed fixup cache methodology that provides heap memory management in an IHS. More specifically, the flowchart of FIG. 4 shows how the fixup cache tool 185 that garbage collector 180 may employ provides for management of object memory. In more detail, garbage collector 180 and fixup cache tool 185 provide compaction and object fixup during application 182 execution.

The disclosed fixup cache method starts, as per block 405. Garbage collector 180 performs a test to determine if there are objects to move, as per block 410. For example, garbage collector 180 may determine that moving particular objects, such as those of object string 250, within heap 200 provides memory compaction benefits. In that case, garbage collector 180 moves a particular object, as per block 420. The move of object A to object A', as shown in FIG. 2A and FIG. 2B collectively, may be part of a larger move of an object string. For example, the move of object string 250 to object string 250' requires more than one object move.

Garbage collector 180 stores object pointer information in fixup cache 300, as per block 425. In more detail, garbage collector 180 stores object pointer information for the particular object move, such as that of object A within memory location 210 to object A' within memory location 260. In that case, garbage collector 180 may populate fixup cache 300 with pointer information, such as that shown in column 310 and column 315 of FIG. 3. In this manner, fixup cache 300 provides the necessary pointer information to fixup or populate proper pointer information corresponding to object A' within memory location 260 of heap 200.

Fixup cache tool 185 fixes up the next object, as per block 430. In other words, the next object within object string 250, namely object A' that garbage collector 180 moves, requires fixup for proper pointer organization. The correct pointer information for object A' after the move of object string 250 to object string 250' resides in fixup cache 300, as shown in column 315 of FIG. 3. During heap 200 fixup, fixup cache tool 185 populates the contents of object A' with object A' pointer information from fixup cache 300. In this case, object A' within memory location 260 of heap 200 requires a pointer to the next object within object string 250', namely object B'. Fixup cache tool 185 populates object A' within memory location 260 of heap 200 with pointer to object B' information from fixup cache 300, as shown in column 315/row 380. In this manner, object A', within memory location 260 of heap 200 now points to object B', within memory location 270 of heap 200 and is thus fixed up.

Application 182 may require object C information within heap 200 after the move of object string 250, but prior to fixup of object C. In that case, application 182 may interrogate fixup cache 300 and locate object C pointer information, as shown in FIG. 3 column 335. In that case, application 182 receives a cache hit and does not require additional resources of IHS 100 during object C use.

Garbage collector 180 advances to the next object move and fixup object, as per block 440. In other words, after fixup cache tool 185 fixes object A, garbage collector 180 moves to the next object, namely object B of object string 250. Garbage collector 180 may move objects prior to fixup cache 300 fixing up those objects. In one embodiment of the disclosed fixup cache tool, garbage collector 180 may move multiple objects before fixup cache 300 begins fixup operations. For example, garbage collector 180 may move the entire object string 250 of objects, namely object A, object B, and object C, prior to fixup cache 300 initiating fixup of object A. This out of sequence capability provides flexibility for resources of application 182 during execution within IHS 100 by reducing wait time between move and fixup operations.

Garbage collector 180 continues testing to determine if there are remaining objects to move, as again per block 410. If there are more objects to move, garbage collector 180 continues as before until all objects, such as all objects of object string 250, move to new locations within heap 200 memory locations. However, if there are no more objects to move, garbage collector 180 performs a test to determine if there are objects to fixup, as per block 450. In this manner, garbage collector 180 determines if there are remaining objects, such as those of object string 250, that fixup cache tool 185 has yet to fixup.

For example, garbage collector 180 may move object string 250 to generate object string 250', but only fixes up object A' and object B'. In this case, object C' still requires a fixup and fixup cache tool 185 performs that task. Fixup cache tool 185 fixes up the next object, as per block 460. If there are still more objects to fixup, fixup cache tool 185 advances to the next fixup object, as per block 470. However if there no objects left to fixup, then the disclosed fixup cache method ends, as per block 480. In this manner, fixup cache 300 provides storage for dynamically changing location pointer information corresponding to moving objects. The disclosed methodology uses the location pointer information in the fixup cache to correct the pointer information associated with the moved objects.

As will be appreciated by one skilled in the art, aspects of the disclosed fixup cache methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 4 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIG. 4 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 4 described above.

The flowchart of FIG. 4 illustrates the architecture, functionality, and operation of possible implementations of systems, methods and computer program products that perform network analysis in accordance with various embodiments of the present invention. In this regard, each block in the flowchart of FIG. 4 may represent a module, segment, or portion of code, which comprises one or more executable instructions for implementing the specified logical function(s). It should also be noted that, in some alternative implementations, the functions noted in the block may occur out of the order noted in FIG. 4. For example, two blocks shown in succession may, in fact, be executed substantially concurrently, or the blocks may sometimes be executed in the reverse order, depending upon the functionality involved. It will also be noted that each block of FIG. 4 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method, comprising:
   storing an object string in a memory heap, the object string including first and second objects, wherein the first object points to the second object, the second object pointing to another object;
   moving, by a garbage collector, one of the first and second objects to a new location in the memory heap, thus providing a moved object;
   storing in a fixup cache in a system memory, by a fixup cache tool associated with the garbage collector, location pointer information corresponding to the moved object;
      wherein the fixup cache includes first and second cells, the first cell storing location pointer information pointing from the moved object to a preceding object in the object string, the second cell storing location pointer information pointing from the moved object to a next object in the object string;
      wherein the fixup cache tool is external to the garbage collector tool; and
   modifying the moved object, by the fixup cache tool, with the location pointer information stored in the fixup cache in the system memory and corresponding to the moved object; wherein the modifying step is performed immediately after the storing in a fixup cache step.

2. The method of claim 1, wherein the modifying step is performed after the storing in a fixup cache step and before moving the another object.

3. The method of claim 1, wherein the object string comprises a character string.

4. The method of claim 1, wherein the garbage collector tool and fixup cache tool operate within a virtual machine.

5. An information handling system (IHS), comprising:
   a processor;
   a system memory, coupled to the processor, the system memory including:
      a garbage collector tool that is configured to:
         store an object string in a memory heap within the system memory, the object string including first and second objects, wherein the first object points to the second object, the second object pointing to another object;
         move one of the first and second objects to a new location in the memory heap, thus providing a moved object;
   the memory further including:
      a fixup cache tool that is configured to:
         store, in a fixup cache in the system memory, location pointer information corresponding to the moved object; and
         modify the moved object with the location pointer information stored in the fixup cache in the system memory and corresponding to the moved object;
         wherein the fixup cache includes first and second cells, the first cell storing location pointer information pointing from the moved object to a preceding object in the object string, the second cell storing location pointer information pointing from the moved object to a next object in the object string;
         wherein the fixup cache tool is external to the garbage collector tool;
         wherein the fixup cache tool modifies the moved object with the location pointer information stored in the fixup cache immediately after storing the location pointer information corresponding to the moved object in the fixup cache.

6. The IHS of claim 5, wherein the fixup cache tool modifies the moved object with the location pointer information stored in the fixup cache after storing the location pointer information corresponding to the moved object in the fixup cache and before the garbage collector tool moves the another object.

7. The IHS of claim 5, wherein the object string comprises a character string.

8. The IHS of claim 5, wherein the garbage collector tool and fixup cache tool operate within a virtual machine in the system memory.

9. A computer program product, comprising:
   a non-transitory computer readable storage medium;
   first instructions that store an object string in a memory heap, the object string including first and second objects, wherein the first object points to the second object, the second object pointing to another object;
   second instructions that move one of the first and second objects to a new location in the memory heap, thus providing a moved object;
   third instructions that store, in a fixup cache in a system memory, location pointer information corresponding to the moved object;
      wherein the fixup cache includes first and second cells, the first cell storing location pointer information pointing from the moved object to a preceding object in the object string, the second cell storing location pointer information pointing from the moved object to a next object in the object string;
      wherein the fixup cache tool is external to the garbage collector tool; and fourth instructions that modify the moved object with the location pointer information stored in the fixup cache in the system memory and corresponding to the moved object; wherein the fourth instructions modify the moved object with the location pointer information stored in the fixup cache immediately after the third instructions store location pointer information in the fixup cache location corresponding to the moved object;

wherein the first, second, third and fourth program instructions are stored on the computer readable storage medium.

10. The computer program product of claim 9, wherein the fourth instructions modify the moved object with the location pointer information stored in the fixup cache after the third instructions store location pointer information in the fixup cache location corresponding to the moved object and before moving the another object.

\* \* \* \* \*